Nov. 2, 1948.  W. HARTRANFT  2,452,752
METHOD OF MAKING ELASTIC CHAINS
Filed Jan. 13, 1947
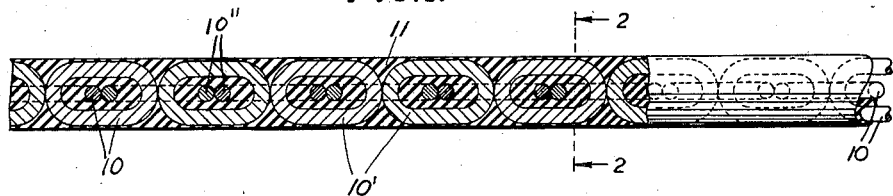
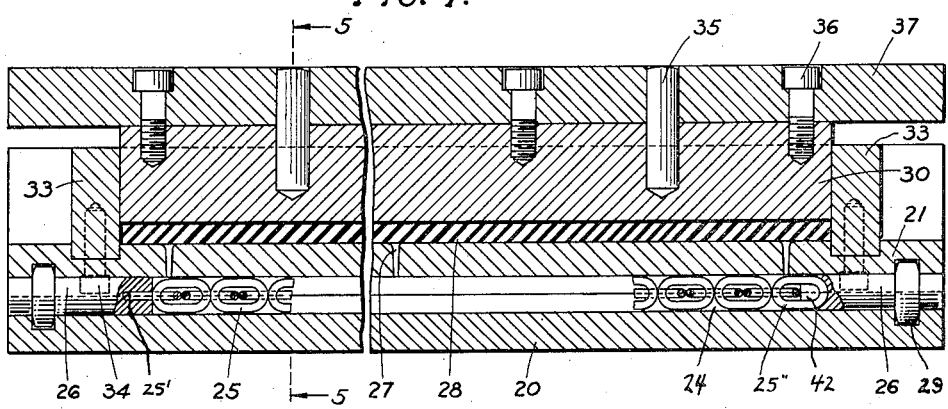
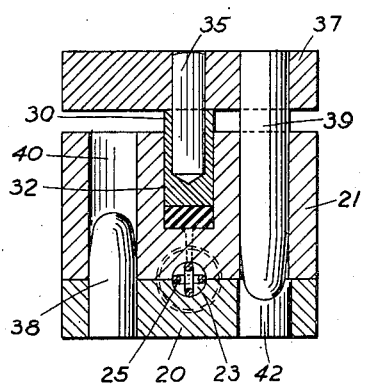
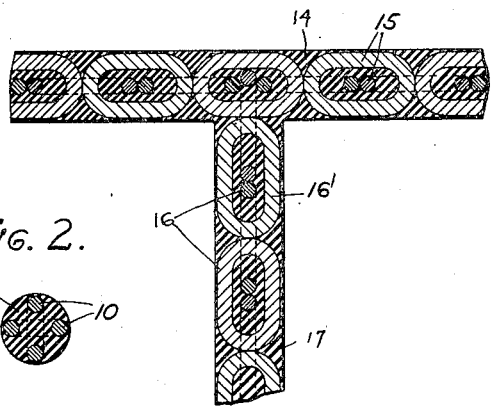
INVENTOR.
WILLIAM HARTRANFT
BY
ATTORNEY Patented Nov. 2, 1948

2,452,752

UNITED STATES PATENT OFFICE 2,452,752

METHOD OF MAKING ELASTIC CHAINS

William Hartranft, Palmyra, N. Y., assignor to Elastic Chain Company, Bratenahl, Ohio, a firm Application January 13, 1947, Serial No. 721,862

5 Claims. (Cl. 18—59)

The present invention relates to extensible and flexible articles such as chains, and to a method for manufacturing such articles.

The invention has many fields of application. Chains made according to the present invention may, for instance, be used with advantage for many different purposes as will be pointed out in more detail hereinafter. One important field of application of the invention, however, is the non-skid chain such as is used on automotive vehicles.

Anti-skid devices for automotive vehicles are usually made in two general types. There is the stationary type and the movable type. The stationary type usually consists of a single or a double strand chain which extends around the tire and which is fastened to the wheel by passing a pliable fabric or leather strap between the spokes of the wheel or through a small slot in the wheel. The movable type anti-skid device usually consists of a chain that envelopes the whole tire and is movable relative thereto.

The stationary type device is usually referred to as a "lug." It is difficult to put this type of device on a wheel because the fastening strap must be guided between the spokes or through the wheel slot from the inside out. It is difficult to remove this type of device from a wheel because it is usually fastened with a buckle or a similar connection and such a connection becomes filled with mud, ice or snow. One further serious drawback of this type of device is that it wears and injures the tire excessively, since the contact of the chain with the tire is continually in one place.

The movable type anti-skid chain has the advantage of eliminating excessive wear at any one point. As previously constructed, however, these chains can not be put on a car without jacking the car up. Further than this, chains of this type have to be locked on both inside and outside, and it is difficult to lock the inside connection without contacting the dirty tire. This type of anti-skid device is, moreover, noisy as the loose fit of the chain on the tire, which allows movement of the chain around the tire, causes a slap when the car is in motion. Chain tighteners are sometimes employed to eliminate the slap, but these introduce the disadvantages of any stationary type chain; they prevent movement of the chain around the tire and cause wear of the tire.

With either the stationary or movable type anti-skid device, if a link of the chain breaks, the automobilist should stop at once and remove the lug or chain and repair the break, for the loose ends of the chain hitting against the fender or brake mechanism are extremely noisy and will cause damage to the fender or brake mechanism if the car is run for any considerable length of time without repairing or replacing them.

One object of the present invention is to provide a non-skid device which will be much easier to mount on and remove from a wheel than any anti-skid device heretofore manufactured.

Another object of the invention is to provide an anti-skid device of the chain type which will be substantially noiseless in use even though it be used while a link of the chain is broken.

A further object of the invention is to provide a chain-type anti-skid device which can be run for miles after a link of the chain is broken without requiring that the car be stopped on the road to remove the broken chain.

Another object of the invention is to provide a chain-type anti-skid device which will protect the tire from wear.

Another object of the invention is to provide a chain-type anti-skid device which will prevent sidewise skidding of an auotomobile.

Another object of the invention is to provide an anti-skid device which will not clog with mud, ice or snow.

A further object of the invention is to provide a chain of sufficient stiffness to permit easy manipulation of the chain.

Still another object of the invention is to provide an anti-skid device which may be applied to a tire or removed therefrom from the outside of the wheel without the necessity of hooking or unhooking a fastening device on the inside of the wheel.

A still further object of the invention is to provide an anti-skid device which may extend all around the periphery of a tire and be secured over the tire without any fastening device whatsoever.

A still further object of the invention is to provide an anti-skid device which will combine all of the good features of previous types of anti-skid devices while eliminating their undesirable features and which in addition will supply additional advantages heretofore unknown in anti-skid devices, and which, moreover, will be relatively inexpensive.

A still further object of the invention is to provide a new type flexible connecting member which may be employed wherever a flexible and extensible connection between two relatively movable parts is desired, or wherever a flexible limit stop is wanted.

Other objects of the invention will be apparent hereinafter from the specification and from the recital of the appended claims.

The present invention provides a relatively stiff, but flexible chain by contracting a standard chain to its minimum length, filling the interstices between the links with unvulcanized rubber and curing or vulcanizing the rubber with the chain contracted. The finished chain filled and covered with rubber to any desired outside dimension can be stretched or elongated to close to the length of the original chain. Thus a chain made according to the present invention is relatively stiff but flexible and protected. For use on automobile tires, either a section of chain of suitable length may be used and both ends of the section left open, that is, free of rubber, to create eyes through which suitable fastening devices may be connected, or one end of the chain can be secured to a hook member which is adapted to be engaged in the open link at the other end of the chain. It is also possible for movable type chains to use an endless chain of suitable size. This may be placed on or removed from the tire by expanding each side of the chain against the rubber contained in the interstices of the chain.

The invention is not limited to use, however, for anti-skid purposes. It may be employed wherever a flexible connection is desired between two relatively movable parts; for instance, as a means of preventing a door from being opened too far, or as a means for securing a boat to a dock.

To make a chain according to the present invention, the preferably method is to provide a mold with cavity of the proper dimensions; place a chain in the cavity in fully contracted position; close the cavity; force unvulcanized rubber into the cavity under pressure through a sprue or gate provided for the purpose in the mold until the interstices between the links of the chain are filled with rubber and the chain is covered by a sheath of rubber; and then vulcanize the rubber.

In the drawings:

Fig. 1 is a part sectional, part elevational view of a chain made according to one embodiment of this invention;

Fig. 2 is a section on the line 2—2 of Fig. 1;

Fig. 3 is a fragmentary sectional view of movable type anti-skid chain having cross-links made according to one embodiment of this invention;

Fig. 4 is a longitudinal sectional view illustrating the method, and one form of apparatus for manufacturing a chain according to this invention; and Fig. 5 is a section on the line 5—5 of Fig. 4.

Referring now to the drawings by numerals of reference 10 denotes the links of a chain made according to this present invention. As shown in the drawings, the links are in fully contracted position, each erect link 10′ of the chain making contact with both a preceding and a succeeding erect link; and each transverse link 10″ making contact with both a preceding and succeeding transverse link. The interstices of the links are filled with rubber, and preferably the links are also covered with rubber, the rubber being here designated 11.

For a movable type automobile chain, two side chains, for the inside and outside of the tire will be used, as is customary in the art, and suitable ground-engaging cross-chains will be connected to the side chains at desirable intervals. A chain of this type is illustrated in Fig. 3. Here one of the side chains 14 is shown fragmentarily, its links being designated 15, and one of the cross-chains 17 is shown fragmentarily, its links being denoted at 16. The links of the side chain and of the cross-chain are shown in fully contracted positions, each link of each chain contacting the next succeeding and the next preceding link of that chain. In the instance shown, the link 16′ of the cross-chain is made slightly longer than the other links of that chain so as to permit of full contraction of the links of the side chain. By making the links of the cross-chain 17 shorter than the links of the side chain 14, however, all the links of the cross-chain may be made of the same size and still be fully contracted, as will be obvious. The interstices between the links of both side and cross-chains are filled with rubber and preferably the links are encased in rubber, as shown.

One way of making a chain according to the present invention is illustrated in Figs. 4 and 5. Here is shown the manufacture of a straight chain according to this invention. A two-part mold is employed, the two parts of the mold being designated at 20 and 21, respectively. These two parts are provided with aligning cavities which together form a receptacle 24 for a section of chain 25 which is to be used as the base for manufacture of a chain according to the present invention. Stop members 26 are mounted between the mold parts 20 and 21 to serve as abutments for the ends of the chain. The stop members are placed between the two mold blocks 20 and 21 at opposite ends thereof and are locked against movement relative to the blocks by collars 29 which are formed on the stop and which engage in suitable recesses formed in the mold blocks. In the manufacture of a straight chain, the provision of some form of stops is a very important feature of the invention, because unless some means is provided for preventing the ends of the chain from moving while the rubber is being pressed in and around the links of the chain, the chain can not be held in the fully contracted position which is essential to realize the advantages of this invention.

The rubber 28, which is to be forced between and around the links of the chain, is placed in a plastic state above the upper mold block 21. This block is provided with sprue openings 27 through which this plastic rubber may be forced into the cavity 24 between the mold blocks. The rubber 28 can be injected into and around the links of the chain by forcing down a ram 30 which is adapted to reciprocate in a recess 32 (Fig. 5) provided therefor in the mold block 21.

The ram 30 is held against slippage sidewise or lengthwise during its ramming movement by the sides of the recess 32 and by blocks 33 which are secured by screws 34 to the mold block 21 and which engage opposite ends of the ram. The ram is secured by dowel pins 35 and screws 36 to a plate 37. Centering pins 38 and 39 serve, respectively, to hold the two mold blocks 20 and 21 and the mold block 21 and ram 30 in correct relationship during the ramming operation. Pins 38 enter recesses 40 in the block 41 and the pins 39 are secured to the plate 37 and enter aligned recesses 42 formed in the blocks 21 and 20. The ramming operation may be effected by placing the mold blocks and ram in a suitable press.

After the rubber has been injected into the interstices of the links of the chain and around the links, it is vulcanized in position. This may be effected by applying heat to the molds while still in the press, or in any other suitable manner.

In the instance shown, portions of the end links 25′ and 25″ of the chain are left open, that is, free of rubber so that hooks or other fastening devices can readily be attached to the chain. For this purpose, the blocks 26 are provided with recesses 42 to receive the end halves of these end links.

The contraction of the chain prior to molding the rubber around it, which involves placing the chain in the mold cavity with each erect and each transverse link of the chain moved forward until contact is made with a preceding erect or transverse link, respectively, results in reducing the length of a given piece of chain to approximately two-thirds of its extended or maximum length. The amount of contraction will, of course, vary according to the size of the individual links and the diameter of wire or rod used in the construction of the chain. The finished chain filled or covered with rubber can, however, be stretched or elongated to close to the original length of the uncovered, extended chain. Hence a stretchable chain is provided that may be used wherever elasticity is a desirable quality in a chain. The usual anti-skid device comprises chains provided with hooks, buckles or other similar fastening means, and everyone who has had experience in applying and removing such devices realizes the difficulty involved, particularly when the fasteners or hooks are encased in mud, or ice, or are damaged so that their relatively movable parts are out of line.

An anti-skid chain made according to the present invention is easy to mount on or remove from a tire. With a chain provided with a hook or similar means for fastening its ends, this may be accomplished by simply reaching back of the tire and slipping the end link of one side chain over the cooperating hook. Then by stretching the chain, the end link of the opposite side chain is easily attached to its hook. If the invention is embodied in a stationary type of chain, the hook or wire attached to one end of the chain can be inserted through the wheel or between the spokes thereof from the inside, the chain stretched and fastened to the other end of the hook. A chain made according to the present invention is sufficiently stiff to permit this to be done readily. The recoil or elastic characteristics of the rubber keep either type of chain in close adherence to the tire at all times. Thereby all chance of a clattering noise is eliminated.

A movable type tire chain made according to the present invention will not clog with mud, ice or snow. It moves over the surface of the tire from its maximum forward position to its maximum backward position, this movement being created by the direction and speed with which the wheel is turning and by the surface on which the tire is traveling. This prevents clogging of the chain with mud, ice or snow.

When a link of an anti-skid chain made according to the present invention wears completely through, the strands of rubber woven in and around the chain serve to hold the worn link in position. It is therefore unnecessary to stop on the road to remove the broken chain and the chain can be used until it can be conveniently removed.

The rubber cushion around the chain made according to the present invention contacts the tire preventing damage to the tire. When the chain elongates, the chain will not roll, but the same side of the chain will remain in contact with the tire. Moreover, as the elastic chain elongates, contact is made over a large area of the tire. This protects the tire from wear.

Since the ground-engaging cross-chain portions of a movable type anti-skid chain made according to the present invention in their maximum extended lengths under tension are considerably longer than the cross-chain portions of an ordinary anti-skid chain, the cross-chain portions not only cross the tread of the tire to give traction and prevent skidding in a forward and backward direction, but the cross loops they describe in crossing the tread act to prevent sidewise skidding of the vehicle.

It is to be understood, of course, that the invention herein described can be used for other purposes than automobile chains. It can be applied wherever strength is desired and where slack is a detriment, as, for instance, in anchoring or tying a boat. It may be employed, also, to cushion sudden jars or shocks, as, for instance, as a door-stop, or for a tether or a leash for animals.

It is also to be understood that the principles of the invention can be applied to other articles than chains. For instance, a wire spring, or a coiled or looped cable or rope can be covered and the interstices thereof filled with rubber according to the principles of the present invention to provide an elastic article. In each case, the spring or cable or rope will be contracted to the maximum degree before vulcanizing the rubber in and around its interstices.

While the process of making the chain has been described in connection with use of a mold, it will be understood that the rubber may be applied to the chain in a standard injection press. Furthermore, it will be understood that while the invention has been described in connection with the use of rubber as the elastic means tending to hold the chain retracted, any other suitable medium may be used instead, such as liquid latex, or a similar material.

In general, it may be said that while the invention has been illustrated in connection with particular embodiments thereof, it is capable of further modification, and this application is intended to cover any varations, uses, or adaptations of the invention following, in general, the principles of the invention and including such departures from the present disclosures as come within known or customary practice in the art to which the invention pertains and as may be applied to the essential features hereinbefore set forth and as fall within the scope of the invention or the limits of the appended claims.

Having thus described my invention, what I claim is:

1. The method of manufacturing an elastic device which comprises contracting a chain to its minimum length, filling the interstices of the chain with rubber, and vulcanizing the rubber in place while the chain is contracted.

2. The method of manufacturing an elastic device which comprises contracting a chain to its minimum length, and filling the interstices of the chain with an elastic medium and adhering said medium to the chain while the chain is so contracted.

3. The method of manufacturing an elastic device which comprises placing a chain in a receptacle with the chain in fully contracted position, injecting an elastic medium into said receptacle and in and around the links of the chain, and allowing the elastic medium to adhere to the chain while holding the chain so contracted.

4. The method of manufacturing an elastic device which comprises taking an extensible and contractible member composed of parts which have interstices therebetween, contracting said member to its minimum length, filling the interstices between said parts with an elastic medium, and adhering said medium to the parts while the member is so contracted.

5. The method of manufacturing an elastic device which comprises contracting a chain to its minimum length, encasing the chain with an elastic medium and filling the interstices of the chain with said medium, and adhering said medium to the chain while the chain is so contracted.

WILLIAM HARTRANFT.

REFERENCES CITED

The following references are of record in the file of this patent:

UNITED STATES PATENTS

| Number | Name | Date |
|---|---|---|
| 158,325 | Starr | Dec. 29, 1874 |
| 1,311,971 | Johnson | Aug. 5, 1919 |
| 2,020,943 | Hallquist | Nov. 12, 1935 |
| 2,080,627 | Morgan | May 18, 1937 |
| 2,110,226 | Hill | Mar. 8, 1938 |